US008889206B2

(12) United States Patent
Lix

(10) Patent No.: US 8,889,206 B2
(45) Date of Patent: Nov. 18, 2014

(54) WHISKEY MAKING METHOD

(76) Inventor: Thomas Steven Lix, Parma, OH (US)

(*) Notice: Subject to any disclaimer, the term of this patent is extended or adjusted under 35 U.S.C. 154(b) by 187 days.

(21) Appl. No.: 13/253,072

(22) Filed: Oct. 5, 2011

(65) Prior Publication Data
US 2012/0088018 A1 Apr. 12, 2012

Related U.S. Application Data

(60) Provisional application No. 61/391,138, filed on Oct. 8, 2010.

(51) Int. Cl.
C12C 13/00 (2006.01)
C12G 3/07 (2006.01)
B27H 3/02 (2006.01)
B24C 1/04 (2006.01)
C12H 1/22 (2006.01)

(52) U.S. Cl.
CPC . B24C 1/04 (2013.01); C12G 3/065 (2013.01); C12H 1/22 (2013.01)
USPC ............ 426/422; 426/11; 426/592; 99/277.1; 217/88

(58) Field of Classification Search
USPC ............... 426/11, 422, 592; 99/277.1; 217/88
See application file for complete search history.

(56) References Cited

U.S. PATENT DOCUMENTS

| 2,079,378 A * | 5/1937 | Mills ............................ 99/277.1 |
| 2,108,661 A | 2/1938 | Farrler et al. |
| 2,114,009 A | 4/1938 | Ramsay |
| 2,203,229 A | 6/1940 | Nilsson et al. |
| 3,021,780 A * | 2/1962 | Bobbe ......................... 99/277.1 |
| 3,259,055 A | 7/1966 | Labs |
| 3,842,723 A | 10/1974 | Boucher |
| 3,942,423 A | 3/1976 | Herzfeld |
| 4,558,639 A | 12/1985 | Hojnoski |
| 4,813,565 A | 3/1989 | Croser |
| 5,054,381 A | 10/1991 | Depeaux et al. |
| 5,102,675 A | 4/1992 | Howell et al. |
| 5,174,461 A | 12/1992 | Sullivan |
| 5,481,960 A | 1/1996 | Sullivan |
| 5,537,913 A | 7/1996 | Vowles |
| 5,647,268 A | 7/1997 | Sullivan |
| 6,203,836 B1 | 3/2001 | Gross, II et al. |
| 6,378,419 B1 | 4/2002 | Ecklein |
| 6,898,834 B1 | 5/2005 | Warren |
| 7,572,495 B2 | 8/2009 | Atkinson |
| 8,381,926 B2 * | 2/2013 | Kenealy et al. ................. 217/72 |
| 2003/0157216 A1 | 8/2003 | Plumb |
| 2005/0031760 A1 | 2/2005 | Plumb |
| 2010/0092636 A1 * | 4/2010 | Watson et al. ................ 426/533 |

FOREIGN PATENT DOCUMENTS

WO WO2011053405 A2 5/2011

* cited by examiner

Primary Examiner — Leslie Wong
(74) Attorney, Agent, or Firm — Cindy Murphy LLC

(57) ABSTRACT

A method (10) of making a wood insert (50) from a dismantled stave (20) of a barrel (12), such as a used bourbon barrel. The method (10) comprises the steps of conditioning the exterior surface (24) of a dismantled stave (20); and profiling the conditioned stave (30) to increase its aging surface area. The profiled stave (20) can then be heat treated (e.g., toasted and/or charred) to create the wood insert (50). The insert (50) can be used to integrate a wood flavoring during the aging of an alcoholic beverage, such as a non-bourbon whiskey.

19 Claims, 4 Drawing Sheets

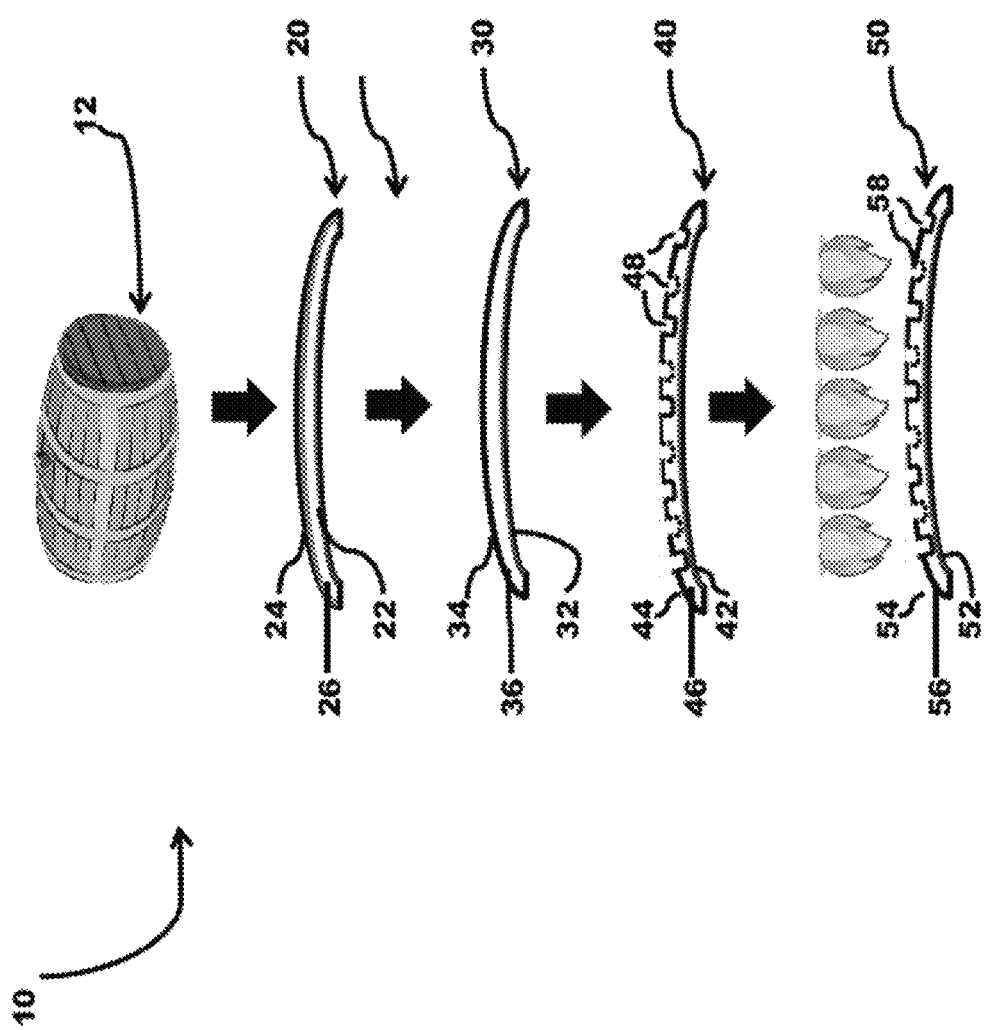

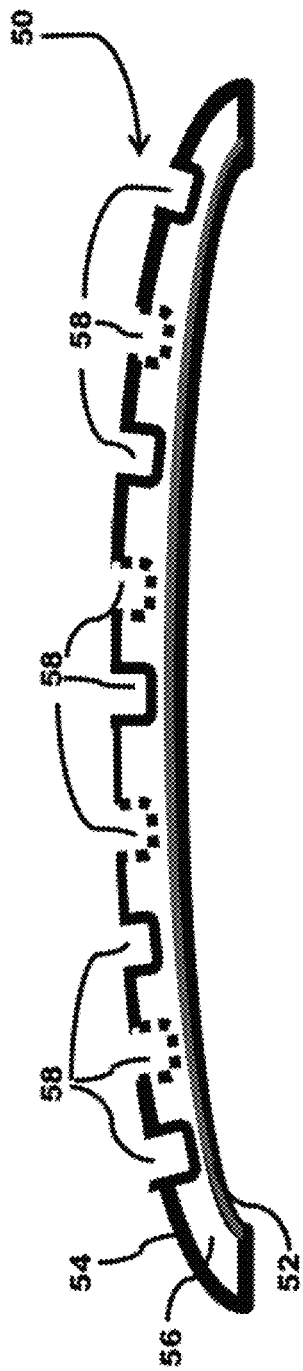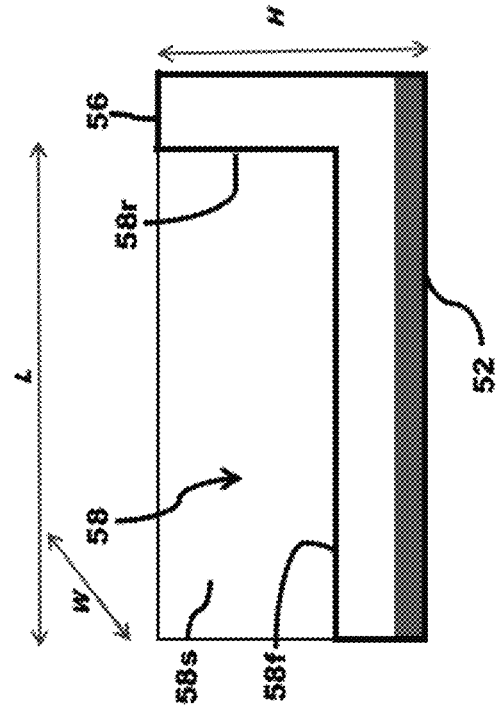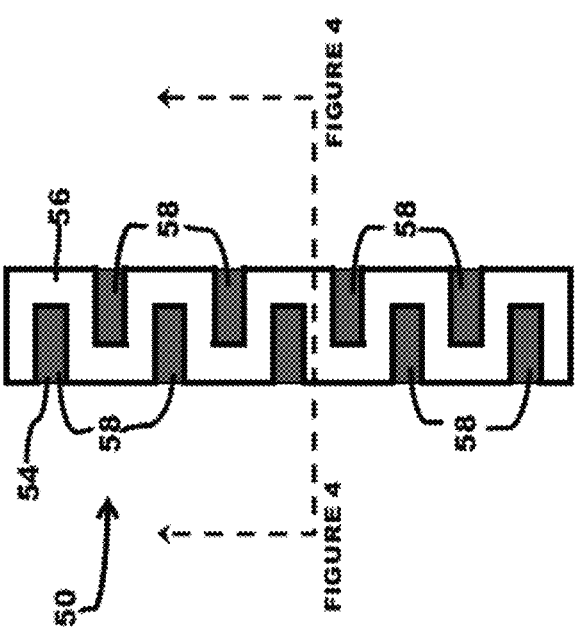

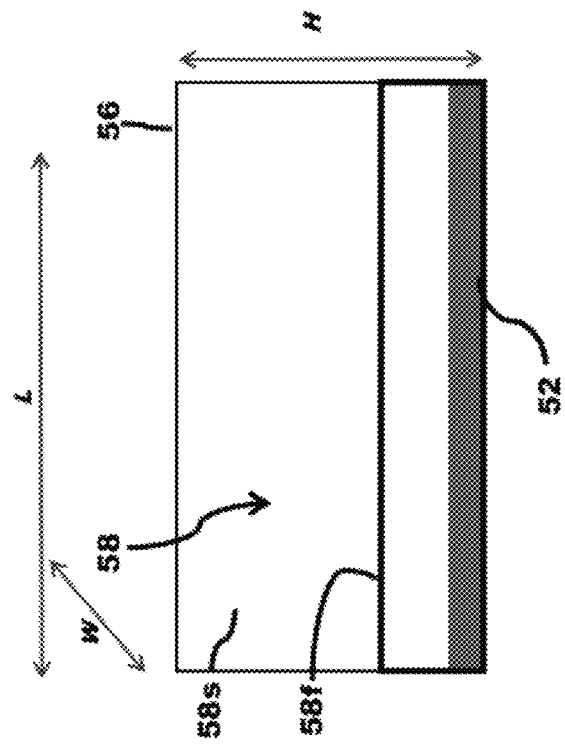
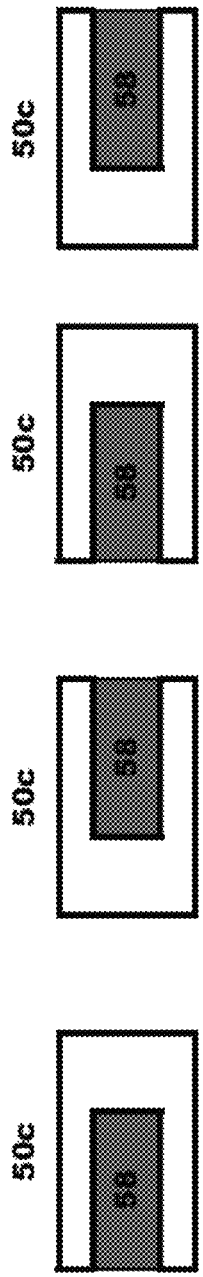
FIGURE 6
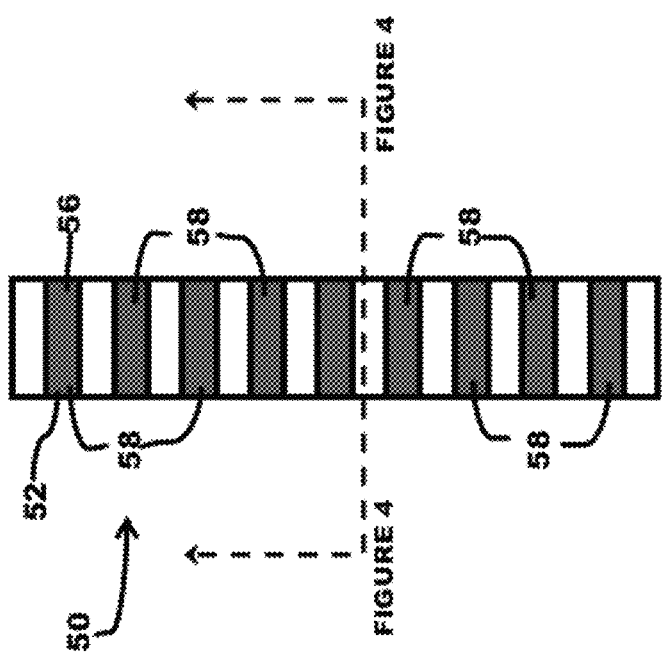
FIGURE 5
FIGURE 7

WHISKEY MAKING METHOD

RELATED APPLICATION

This application claims priority under 35 USC §119(e) to U.S. Provisional Patent Application No. 61/391,138 filed on Oct. 8, 2010. The entire disclosure of this provisional patent application is hereby incorporated by reference.

BACKGROUND

In a traditional whiskey-making method, high proof distillate is aged in an oak barrel and the wood adds color and flavor to the whiskey. But wood barrels are becoming increasingly expensive and their porosity (while important to the aging process) can result in significant evaporation loss. Accordingly, a current trend in non-bourbon whiskey making is to use non-porous containers (e.g., metal, glass, plastic, etc.) with wood inserts positioned therein during the aging process.

SUMMARY

A wood insert is provided for positioning within a container during the aging stage of an alcoholic beverage making process, such as a non-bourbon whiskey making process. The wood insert can be formed from a used wooden barrel and configured to maximize its aging surface area. In this manner, the barrel wood is cost-effectively recycled thereby conserving a scarce albeit renewable resource. With particular reference to used bourbon barrels, the wood insert allows the whiskey maker to capitalize on the inability of bourbon makers to reuse barrels because, by law, bourbon must be aged in new charred barrels. There is plenty of life left in such used barrels and, significantly, they have been properly aged (typically three years of air drying), then toasted, and charred.

DRAWINGS

FIG. 1 is a schematic diagram of a method of making a wood insert from a used bourbon barrel.

FIGS. 2-4 are side, front, and sectional views of the wood insert.

FIGS. 5-6 are front and sectional views of another version of the wood insert.

FIG. 7 shows a wood insert separated into pieces or chips.

DESCRIPTION

Figure 8:
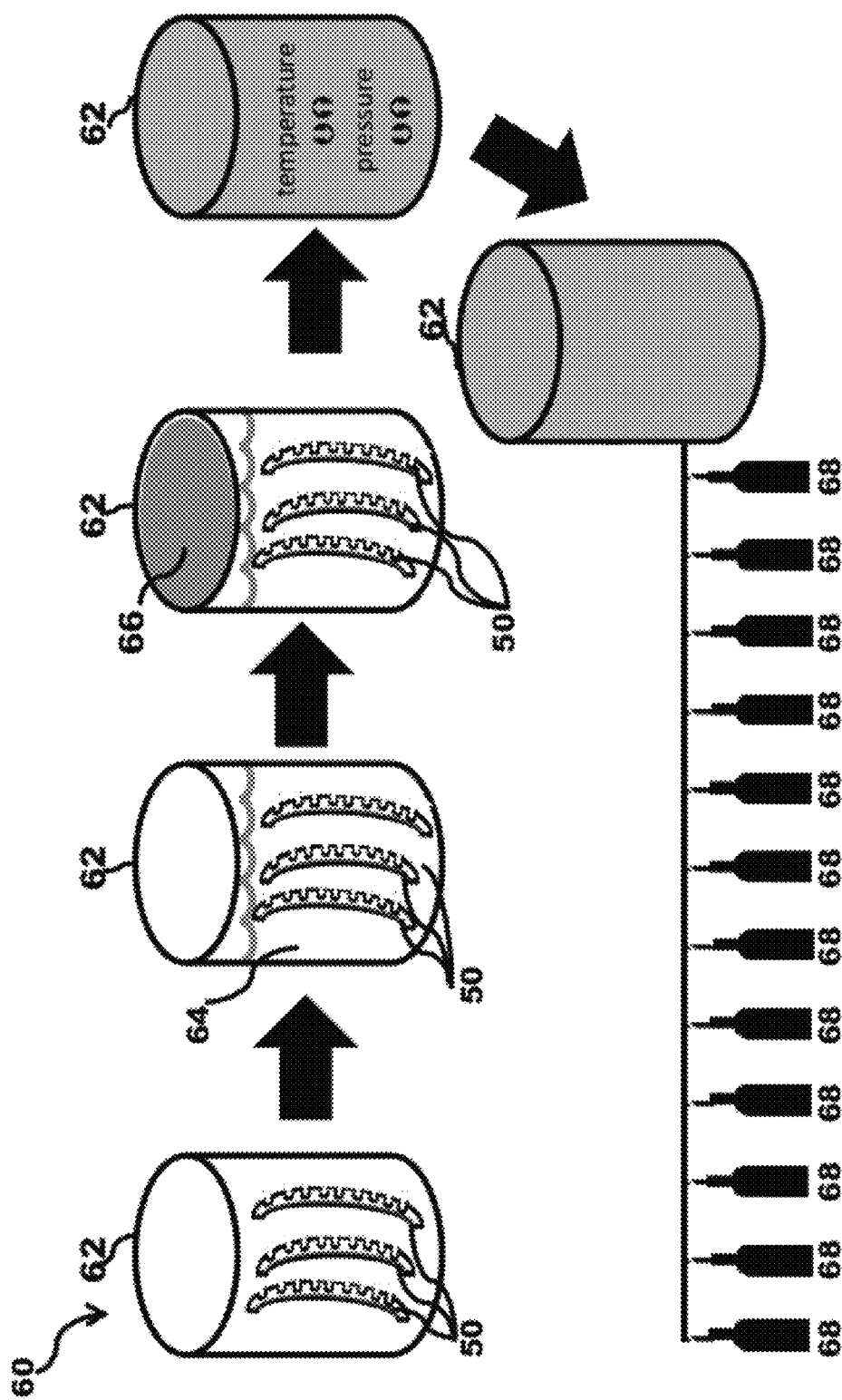
FIG. 8 is a schematic diagram of a whiskey-making method using wood inserts.

Referring now to the drawings, and initially to FIG. 1, a method 10 of making a wood insert 50 is shown. In this method, a wooden barrel 12 is dismantled into a plurality of wood staves 20. The barrel 12 can be, for example, a used barrel such as one previously used for storage and/or aging of consumable product. More specifically, the stave 20 can be acquired from a bourbon barrel, a whiskey barrel, a wine barrel, a sherry barrel, and/or a rum barrel.

Each dismantled stave 20 will have an interior portion 22, an exterior portion 24, and previously unexposed portion 26 therebetween. The interior portion 22 contacted and assisted with the aging of a consumable produce such as bourbon whereby it is typically impregnated and its aging ability somewhat depleted. The exterior portion 24 formed part of the barrel's outer shell and thus may be dirty, chipped, and/or scarred from trials and tribulations encountered along the way (e.g., warehouse storage, shipping, dismantling, etc.). The portion 26 remains pure and intact, as it has been shielded within the interior portion 22 and the exterior portion 24.

The exterior portion 24 of the dismantled stave 20 is sanded, scoured, scraped, or otherwise conditioned to form a conditioned stave 30 (having an interior portion 32, an exterior portion 34, and a previously unexposed portion 36 therebetween).

The conditioned stave 30 can be profiled to increase its aging surface area and thereby form a profiled stave 40 (having an interior portion 42, an exterior portion 44, and a previously unexposed portion 46 therebetween). This profiling step can be accomplished by providing profiling 48 on the stave 40 that extends through the outer surface 44 and into previously unexposed portion 46.

The profiled stave 40 can then be heat treated by methodologies which includes baking, grilling, roasting, convection toasting, and/or flame toasting. Additionally or alternatively, the profiled stave 40 can be exposed to fire in order to form a charred surface. The resultant heat-treatment and/or charring process forms a treated stave 50 (having an interior portion 52, an exterior portion 54, and a previously unexposed portion 56 therebetween).

As is best seen by referring to FIGS. 2-4, the treated stave 50 includes profiling 58 corresponding to the profiling 48 of the stave 40. In the illustrated embodiment, the profiling 58 comprises rectangular notches which each has a floor 58$f$, side walls 58$s$, and a rear wall 58$r$. The profiling step can be performed so as to maximize the exposure of longitudinal faces of the stave 50, or the area collectively occupied by the notch side walls 58$s$. This can be accomplished by minimizing notch width W, curtailing notch spacing, optimizing notch length L and height H, and maximizing the number of notches per stave.

The notches 58 can be, for example, rectangular channels, having a width W of about 0.05 cm to about 0.5 cm and can be spaced apart a distance of about 0.25 cm to about 2.5 cm.

As shown in FIGS. 3-4, the notches 48/58 can have a length L less than the span of stave 40/50, in which case they can be staggered relative to its opposite edges. As shown in FIGS. 5-6, the notches 48/58 can instead have a length L coextensive with the stave span (whereby they will not have a rear wall 58$r$).

The height H of the notches 48/58 is less than that of the entire stave 40/50 (e.g., 95%, 90%, 80%, 70%, 60%, 50%) and preferably extends as close as possible to the interior portion 42/52 so that almost the entire previously un-utilized wood portion 46/56 is exposed.

As shown in FIG. 7, the staves 40/50 can be cut into pieces or chips 40$c$/50$c$, either before or after the charring step.

FIG. 8 shows the use of wood inserts 50 in a method 60 of producing an alcoholic beverage for human consumption. This alcoholic beverage can be, for example, non-bourbon whiskey, beer, wine, or rum. In this method, the inserts 50 are arranged within a container 62 which may be a non-wood and/or non-porous material, such as metal (e.g., steel), ceramic, glass, or plastic drums. Distillate 64 is placed within the container 62 (and thus in contact with the inserts 40), the container 62 is sealed (e.g., with a lid 66), and the aging process initiated. For example, temperature and/or pressure within the sealed container 62 can be controllably varied. After completion of the aging steps, the solution can be drained from the container 61 into bottles 68 for commercial sale.

Although the barrel 12, the wood inserts 20/30/40/50, the profiling 48/58, and/or the whiskey-making method 60 have been shown and described with respect to a certain embodiment or embodiments, it is obvious that equivalent alterations and modifications will occur to others skilled in the art upon the reading and understanding of this specification and the annexed drawings.

REFERENCE NUMBERS 10 wood-insert making method
12 wooden barrel
20 dismantled stave
22 interior portion
24 exterior portion
26 previously unexposed portion
30 conditioned stave
32 interior portion
34 exterior portion
36 previously unexposed portion
40 profiled stave
42 interior portion
44 exterior portion
46 previously unexposed portion
48 notches
50 treated stave
52 interior portion
54 exterior portion
56 previously unexposed portion
58 profiling
58f floor
58s side walls
58r rear wall
60 whiskey-making method
62 container
64 distillate
66 lid
68 bottles

The invention claimed is:

1. A wood insert made from a dismantled stave of a wooden barrel, comprising:
    an interior portion that contacted and aged bourbon while part of the barrel;
    an exterior portion that surrounded the interior portion;
    a previously unexposed portion between the interior portion and the exterior portion; and
    profiling extending through the exterior portion and into the previously unexposed portion to increase aging surface area;
    wherein the profiling comprises notches.

2. A wood insert as set forth in claim 1, wherein the exterior portion is sanded, scoured, scraped or otherwise conditioned.

3. A wood insert as set forth in claim 1, wherein the stave is heat treated.

4. A wood insert as set forth in claim 1, wherein the exterior portion is charred.

5. A wood insert as set forth in claim 4, wherein the profiling comprises rectangular notches.

6. A wood insert as set forth in claim 5, wherein the profiling includes side walls defining longitudinal faces of the stave.

7. A wood insert as set forth in claim 6, wherein the profiling maximizes the surface area of the longitudinal faces.

8. A wood insert as set forth in claim 4, wherein each notch has a width W of about 0.05 cm to about 0.50 cm.

9. A wood insert as set forth in claim 8, wherein the spacing between adjacent notches is about 0.25 cm to about 2.5 cm.

10. A wood insert as set forth in claim 9, wherein the notches have a length less than the stave span.

11. A wood insert as set forth in claim 10, wherein the notches are staggered.

12. A wood insert as set forth in claim 9, wherein the notches have a length coextensive with the stave span.

13. A wood insert as set forth in claim 9, wherein the height H of the notches is less than the stave height.

14. A wood insert as set forth in claim 1, cut into pieces or chips.

15. A wood insert as set forth in claim 1, wherein the stave is from a used wooden barrel.

16. A wood insert as set forth in claim 1, wherein the stave is from a wooden barrel previously used for storage and/or aging of consumable product.

17. A wood insert as set forth in claim 16, wherein the stave is from a bourbon barrel, a whiskey barrel, a wine barrel, or sherry barrel, or a rum barrel.

18. A method of making the wood insert set forth in claim 1, said method comprising the steps of:
    conditioning the exterior surface of the dismantled stave to form a conditioned stave; and
    profiling the conditioned stave.

19. A method of producing an alcoholic beverage for human consumption, said method comprising the steps of placing distillate into a container whereat it is in contact with the wood insert set forth in claim 1.

* * * * *